United States Patent
Guillouët (10) Patent No.: US 7,278,689 B2
(45) Date of Patent: Oct. 9, 2007

(54) INCLINATION ADJUSTMENT FITTING FOR THE BACK REST OF A VEHICLE SEAT

(76) Inventor: Erwan Guillouët, Faurencia Autositze GmbH & Co. KG, Nordsehler Strasse 38, D-31555, Stadthagen (DE)

(*) Notice: Subject to any disclaimer, the term of this patent is extended or adjusted under 35 U.S.C. 154(b) by 0 days.

(21) Appl. No.: 11/444,504

(22) Filed: Jun. 1, 2006

(65) Prior Publication Data
US 2006/0290188 A1    Dec. 28, 2006

(30) Foreign Application Priority Data
Jun. 9, 2005    (DE) .................. 10 2005 026 658

(51) Int. Cl.
*B60N 2/02*    (2006.01)
*B60N 2/35*    (2006.01)

(52) U.S. Cl. ..................... 297/362; 297/367
(58) Field of Classification Search ............. 297/367, 297/362
See application file for complete search history.

(56) References Cited

U.S. PATENT DOCUMENTS

| | | | |
|---|---|---|---|
| 6,619,743 B1 * | 9/2003 | Scholz et al. ............ | 297/362 X |
| 6,755,470 B2 * | 6/2004 | Iwata et al. .............. | 297/362 |
| 6,918,635 B2 * | 7/2005 | Finner et al. ............ | 297/362 |
| 7,086,699 B1 * | 8/2006 | Addison et al. .......... | 297/362 |

FOREIGN PATENT DOCUMENTS

| | | |
|---|---|---|
| DE | 101 57 273 A1 | 6/2003 |
| DE | 103 28 300 A1 | 2/2005 |
| DE | 10 2004 013 272 B3 | 1/2006 |

OTHER PUBLICATIONS

German Office Action dated Mar. 7, 2006 in German Application No. 10 2005 026 658.4-14, filed Jun. 9, 2005 (4 pages).

* cited by examiner

*Primary Examiner*—Anthony D. Barfield
(74) *Attorney, Agent, or Firm*—Shlesinger, Arkwright & Garvey LLP.

(57) ABSTRACT

Inclination adjustment fitting for back rest of a vehicle seat includes first fitting part affixed to seat section, and second fitting part affixed to back rest, and which fitting parts are relatively pivotable around a pivoting axis. The two fitting parts include gearings forming components of a wobble gearing and roll on one another under influence of eccentric elements rotated around the pivoting axis. Eccentric element includes an eccentric ring, on which two wedge segments covering regions of eccentric ring lie in a mirror-image arrangement, and which are forced away from one another in the sense of an increase in eccentricity by a spring. Under excessive load, force transfer between fitting parts not accomplished via wedge segments; rather, a contact cam forming a single piece with eccentric ring projects into gap between end surfaces of wedge segments, transfers load via a contact surface from second fitting part first fitting part.

4 Claims, 7 Drawing Sheets

INCLINATION ADJUSTMENT FITTING FOR THE BACK REST OF A VEHICLE SEAT

CROSS-REFERENCE TO RELATED APPLICATIONS

This application claims priority of German Application No. 10 2005 026 658.4, filed Jun. 9, 2005, and which is incorporated herein by reference.

FIELD OF THE INVENTION

The present invention relates to an inclination adjustment fitting for the back rest of a vehicle seat that includes a first fitting part affixed to seat section, and second fitting part affixed to back rest, and which fitting parts are relatively pivotable around a pivoting axis.

BACKGROUND OF THE INVENTION

Inclination adjustment fittings of this type are provided with internal or external gearing, which are produced by stamping using metal sheet cutouts of the fitting parts. In this, the external gearing has at least one less tooth than the number of teeth in the internal gearing, and one of the fitting parts bears against eccentric elements which are rotatable around the pivoting axis, and which in turn bear against the other fitting part. The eccentric elements used in inclination adjustment fittings of the type under discussion are comprised of two wedge segments, which bear directly or indirectly against the one fitting part, and which are forced apart in a peripheral direction in the sense of an increase in eccentricity by means of a stored-energy device, generally a spring. In this manner, any play in the gearing and in the mounting is eliminated. With actuation of the eccentric elements around the pivoting axis of the inclination adjustment fitting, the internal gearing of the one fitting part rolls on the external gearing of the other fitting part, which causes the fitting part that is affixed to the back rest to pivot relative to the fitting part that is affixed to the seat in a manner corresponding to the difference in the number of teeth.

In DE 10 2004 013 272 B3 an inclination adjustment fitting of this type is described. In this fitting, the wedge segments transfer the load from the fitting part that is affixed to the back rest to the fitting part that is affixed to the seat. This can lead to problems, particularly in the case of an excessive load.

The same problems can occur with the inclination adjustment fitting of this type that is disclosed in DE 103 28 300 A1. With this inclination adjustment fitting, the eccentric ring is provided with a contact cam, which is designed to form a single piece with the eccentric ring, and which projects into the gap between the end surfaces of the wedge segments. The purpose of this contact cam is to limit the shifting of the wedge segments, in order to prevent an overload of the spring that acts upon the wedge segments.

OBJECTS AND SUMMARY OF THE INVENTION

An object of the present invention is to provide an inclination adjustment fitting of this type, in which at least in the event of an excessive load, the transmission of force from fitting part to fitting part does not occur via the wedge segments.

This object is achieved according to the invention with an inclination adjustment fitting for the back rest of a vehicle seat that includes a first fitting part affixable to a vehicle seat, a second fitting part affixable to a back rest of a vehicle seat, and the first fitting part being pivotable relative to the second fitting part around a pivoting axis. A wobble gearing is provided that includes gearings, and the fitting parts, and the gearings rolling on one another under influence of an eccentric element. The eccentric element is rotatable around the pivoting axis, and is provided with an eccentric ring, on which two wedge segments which cover regions of the eccentric ring lie, and the two wedge segments are arranged in a mirror image. The wedge segments are forced away from one another in a sense of an increase in eccentricity by spring elements resting against their end surfaces at one end, and the end surfaces having a gap between them created by their lateral spacing from one another. Carrier elements are arranged between the other end surfaces of the wedge segments for the purpose of impinging upon the wedge segments and against the force of the spring device. The eccentric elements bear the first fitting part affixable to a seat section of a vehicle seat, and the second fitting part affixable to the back rest bearing the eccentric elements. A contact cam is provided that is configured to form a unitary piece with the eccentric ring, projecting into a gap formed between the end surfaces of the wedge segments. The contact cam including a contact surface configured to transfer a load via the contact surface from the second fitting part affixed to the back rest, in use, to the first fitting part affixed to the seat section of a vehicle seat, in use.

According to the invention, the contact cam, which is configured to form a single piece with the eccentric ring and which projects into the gap that exists between the end surfaces of the wedge segments, has a contact surface that serves to transfer the load from the fitting part that is affixed to the back rest to the fitting part that is affixed to the seat.

In one advantageous embodiment of the invention, the contact surface of the contact cam is arranged at a slight radial distance from the fitting part that is affixed to the back rest. This radial spacing is configured such that under normal operating conditions the wedge segments ensure the absence of play in the fitting while serving to produce the degree of eccentricity required to adjust the fitting, and such that in the event of an excessive load the contact surface is placed in contact with the fitting part that is affixed to the back rest as a result of the deformation of fitting components, so that loads are transferred from the back rest, via the contact cam of the eccentric ring, to the seat, and from there to the body of a vehicle.

In another advantageous embodiment of the invention, the contact surface of the contact cam is in continuous contact with the fitting part that is affixed to the back rest. Thus a so-called fixed eccentric is created, and the wedge segments serve only to compensate for any play that may be present due to geometric and positional tolerances. In this case it is advantageous for the contact surface to be configured as large as possible, in order to reduce the specific surface load.

When in the above description a contact between the contact cam and the fitting part that is affixed to the back rest is described, this, of course, refers not only to direct contact but also to indirect contact, for example contact via a bearing ring positioned between the two.

Relative terms such as up, down, left, and right are for convenience only and are not intended to be limiting.

Below, the invention will be described in greater detail with reference to one exemplary embodiment.

DETAILED DESCRIPTION OF THE INVENTION

An inclination adjustment fitting 1 depicted in the set of drawings is a component of an unillustrated vehicle seat, which comprises a seat component and a back rest, and by which the inclination of the back rest component relative to the seat component can be adjusted by means of the inclination adjustment fitting 1. To this end, the inclination adjustment fitting 1 comprises a fitting part 2 affixed to the seat component or section and a further fitting part 3 affixed to the back rest. Both fitting parts 2, 3 are deep-drawn steel sheet blanks, by which the fitting part 2 is provided with an external gearing 4 stamped out of the blank, and the fitting part 3 is provided with an internal gearing 5 stamped out of the blank. The external gearing 4 has the same module (metric) as the internal gearing 5, but contains at least one less tooth. When the inclination adjustment fitting 1 is assembled, the external gearing 4 and the internal gearing 5 mesh with one another. The fitting part 3 is further provided with a rim hole 6 that has a circular through opening 7. An inner bearing ring 8 can be slipped onto the rim hole 6. The fitting part 2 is also provided with a circular through opening 9, arranged concentrically relative to the external gearing 4, into which an outer bearing ring 10 can be inserted.

Figure 7:
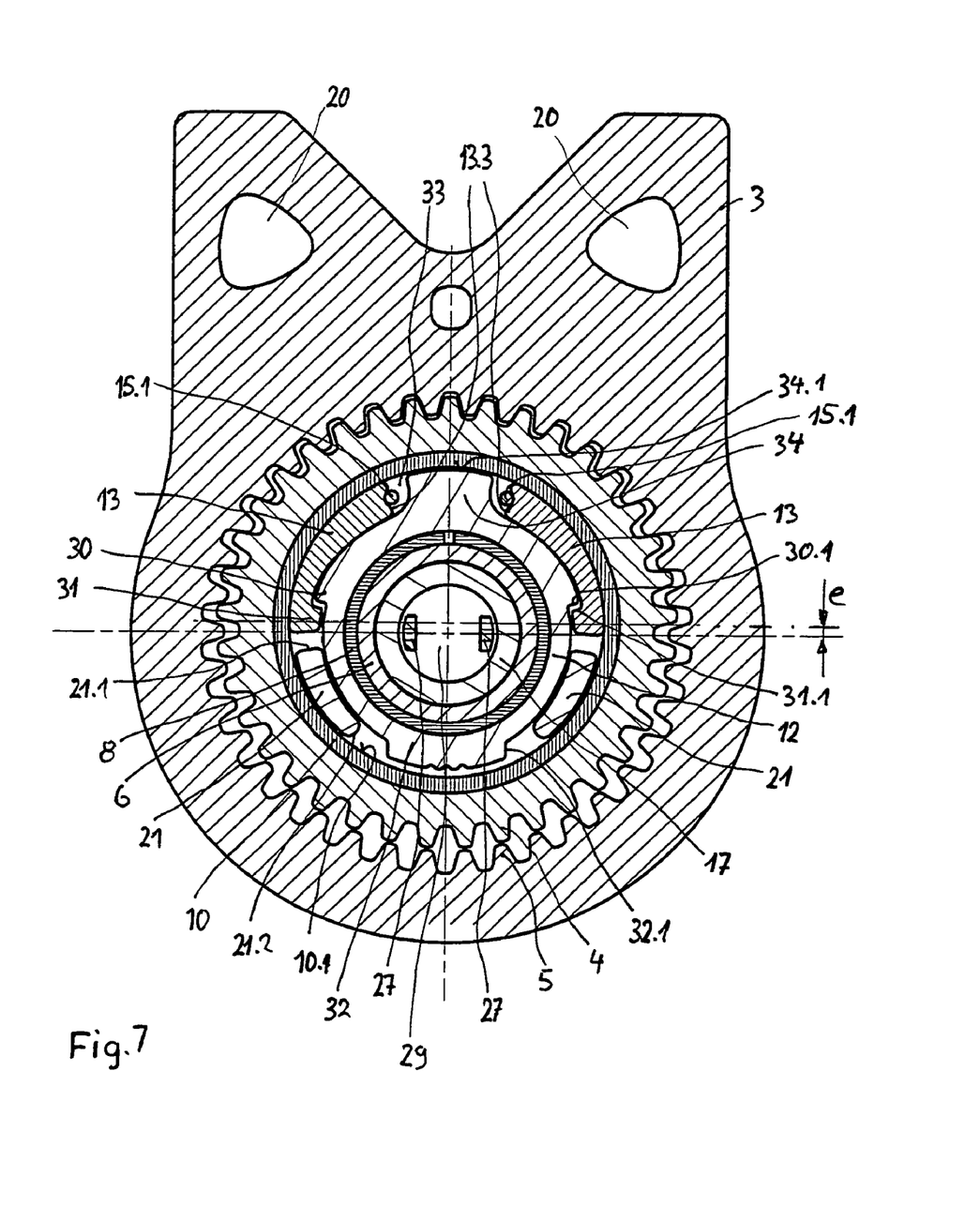
FIG. 7 shows a cross-section C-C of FIG. 3.

The bearing rings 8 and 10 serve as bearings for an eccentric element 11. This includes an eccentric ring 12 and two identical wedge segments 13 that are arranged on said ring in a mirror-image position. When the fitting is assembled, the eccentric ring 12 is pushed onto the inner bearing ring 8, the inner surfaces of the wedge segments 13 rest on an outer surface 12.1 of the eccentric ring 12, and outer surfaces 13.2 of the wedge segments 13 rest against an inner surface 10.1 of the outer bearing ring 10. This arrangement can be most clearly seen in the representation according to FIG. 7. In order to avoid the presence of only one contact point between the inner bearing ring 8 and an inner surface 12.2 of the eccentric ring 12, which would result in a "wobbling" of the fitting part 3 on the fitting part 2, the inner surface 12.2 of the eccentric ring 12 is out-of-round relative to the inner bearing ring 8, so that at least two contact points are provided between these two components. Inner surfaces 13.1 of the wedge segments 13 also do not rest flat against the outer surfaces 12.1 of the eccentric ring 12. The mutual curvatures of the inner surfaces 13.1 and the outer surfaces 12.1 are configured such that linear contact is created between them. The outer surfaces 13.2 of the wedge segments 13, in contrast, have the same curvature as the inner surface 10.1 of the outer bearing ring 10. The wedge segments 13 thus lie flat against the outer bearing ring 10.

The outer surface 12.1 of the eccentric ring 12, which is covered by the wedge segments 13, tapers upwardly forming a wedge shape relative to its inner surface 12.2. The wall thickness of the eccentric ring 12, which is thereby increased, is used at the end of the upward taper to form a projection 30 having a stop surface 30.1 that is oriented radially outward, by which this projection 30 is formed by a material offset to a smaller external dimension of the eccentric ring 12. Stop surfaces 31.1 are allocated to these stop surfaces 30.1 of the eccentric ring 12, positioned on a projection 31 that is oriented radially inward in the area of the narrow end surface 13.4 of the wedge segments 13. Between the stop surfaces 30.1 and 31.1, a gap exists when the eccentric elements 11 are not actuated. As a result of the upward tapering of the outer surface 12.1 of the eccentric ring 12, the inner surfaces 13.1 of the wedge segments 13 are in contact with an opposing wedge surface. This opposing wedge configuration allows an optimal layout for the wedge angle of the wedge segments 13.

Symmetrically to the two projections 30 on the eccentric ring 12, a stop cam 32 with two radial stop surfaces 32.1 is formed on the area of the eccentric ring 12 that is free from the wedge segments 13, by way of an increase in the wall thickness of the eccentric ring 12.

Figure 1:
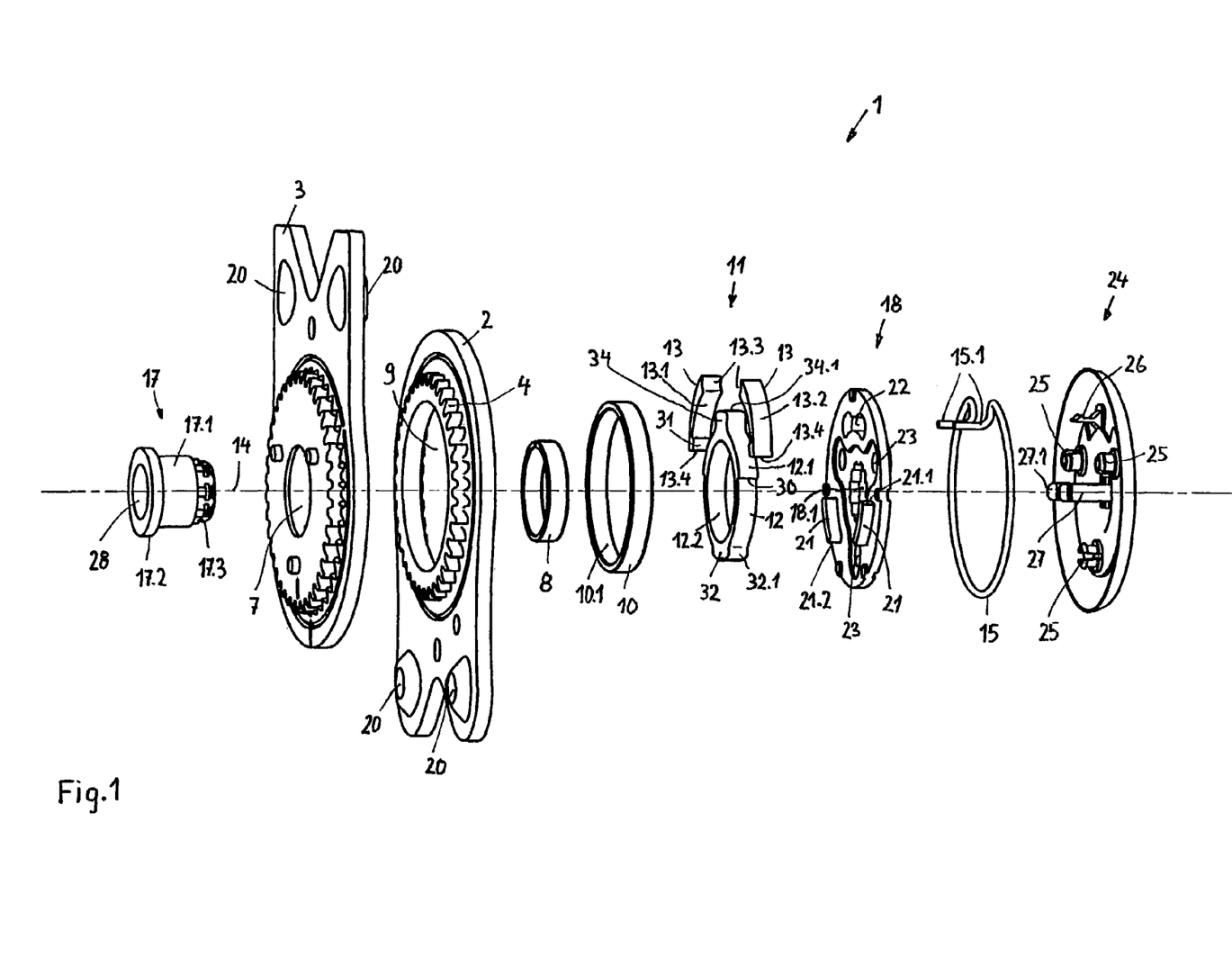
FIG. 1 shows the components of an inclination adjustment fitting of the invention, in an exploded, perspective representation.
Figure 2:
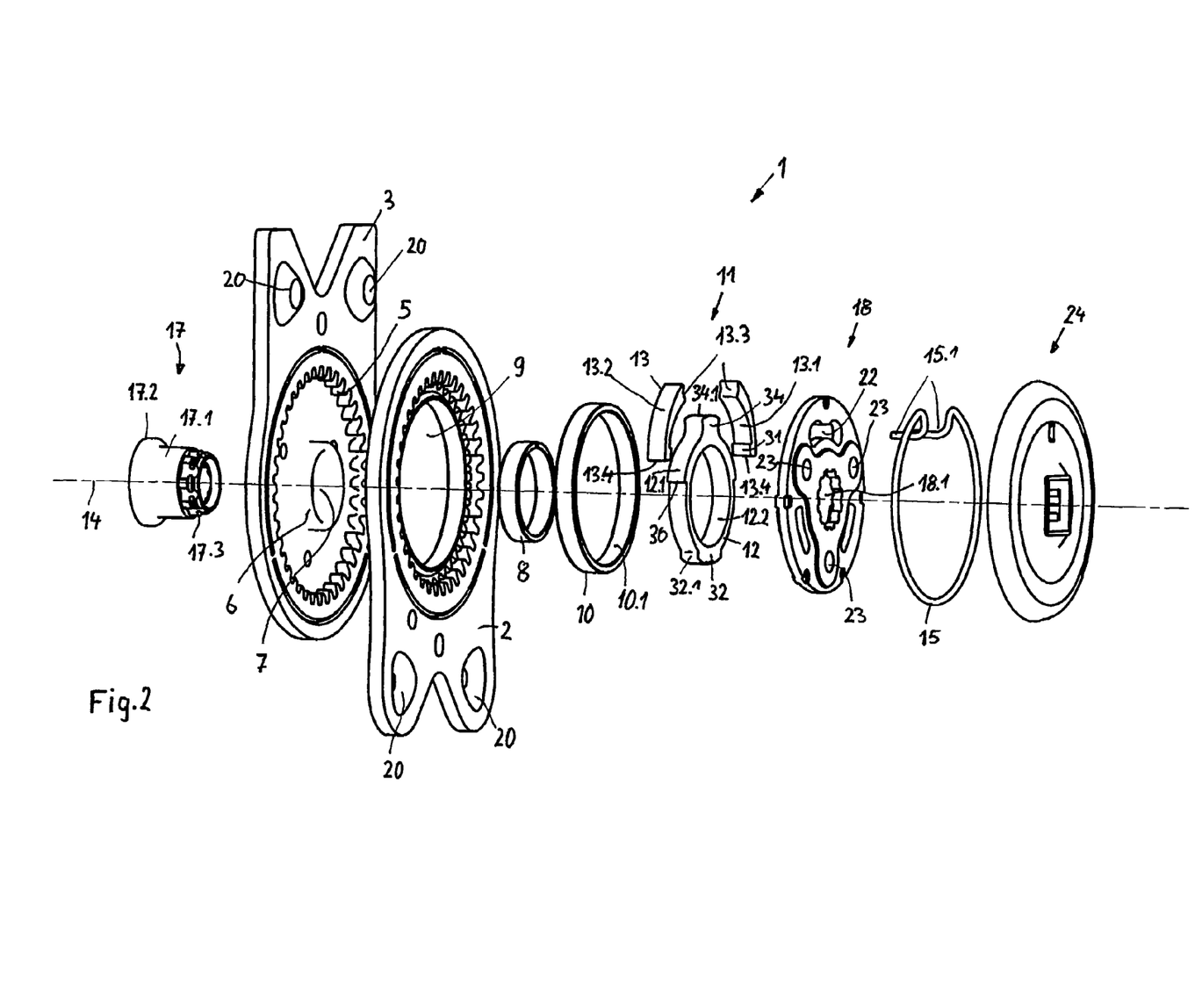
FIG. 2 shows an illustration according to FIG. 1 from a different viewing angle.
Figure 3:
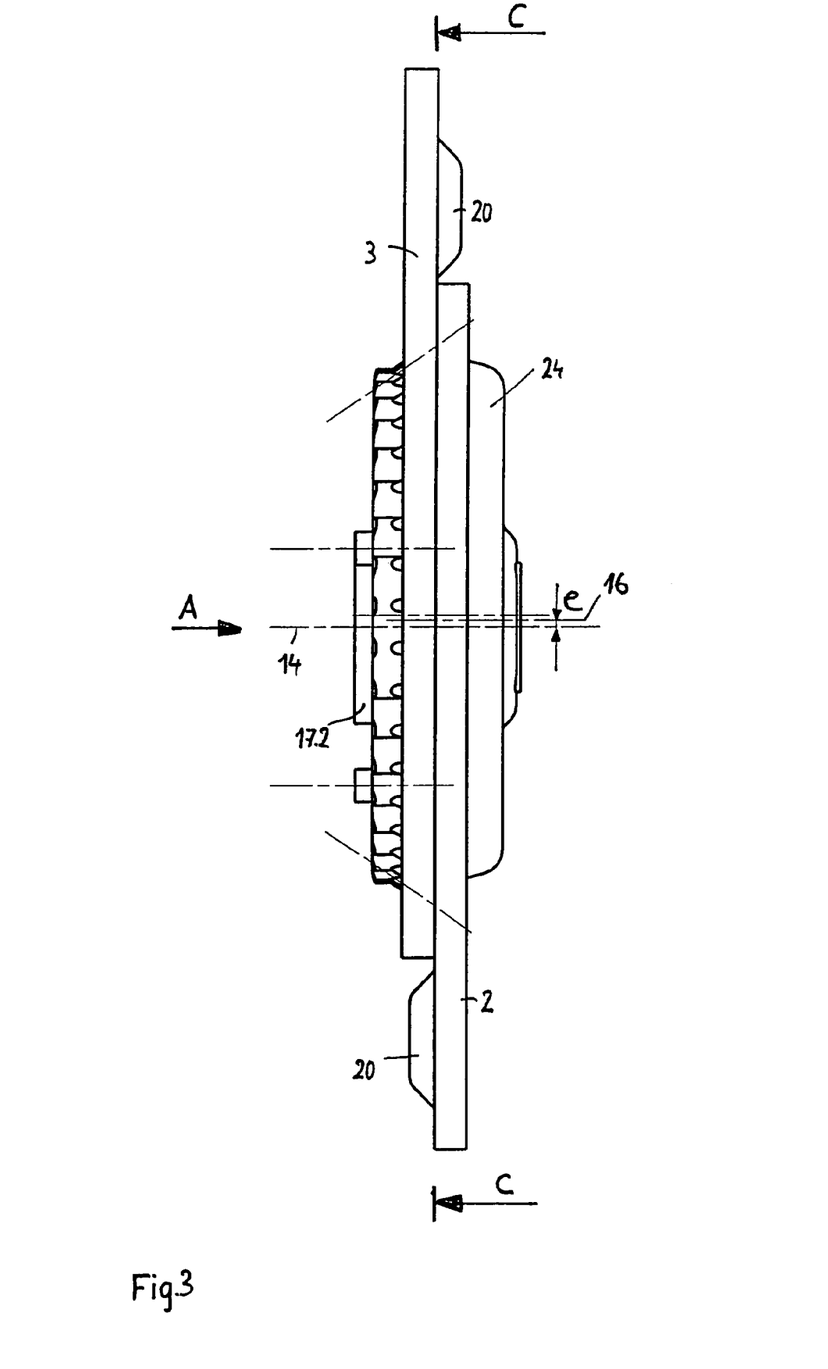
FIG. 3 shows a side view of the assembled inclination adjustment fitting.
Figure 4:
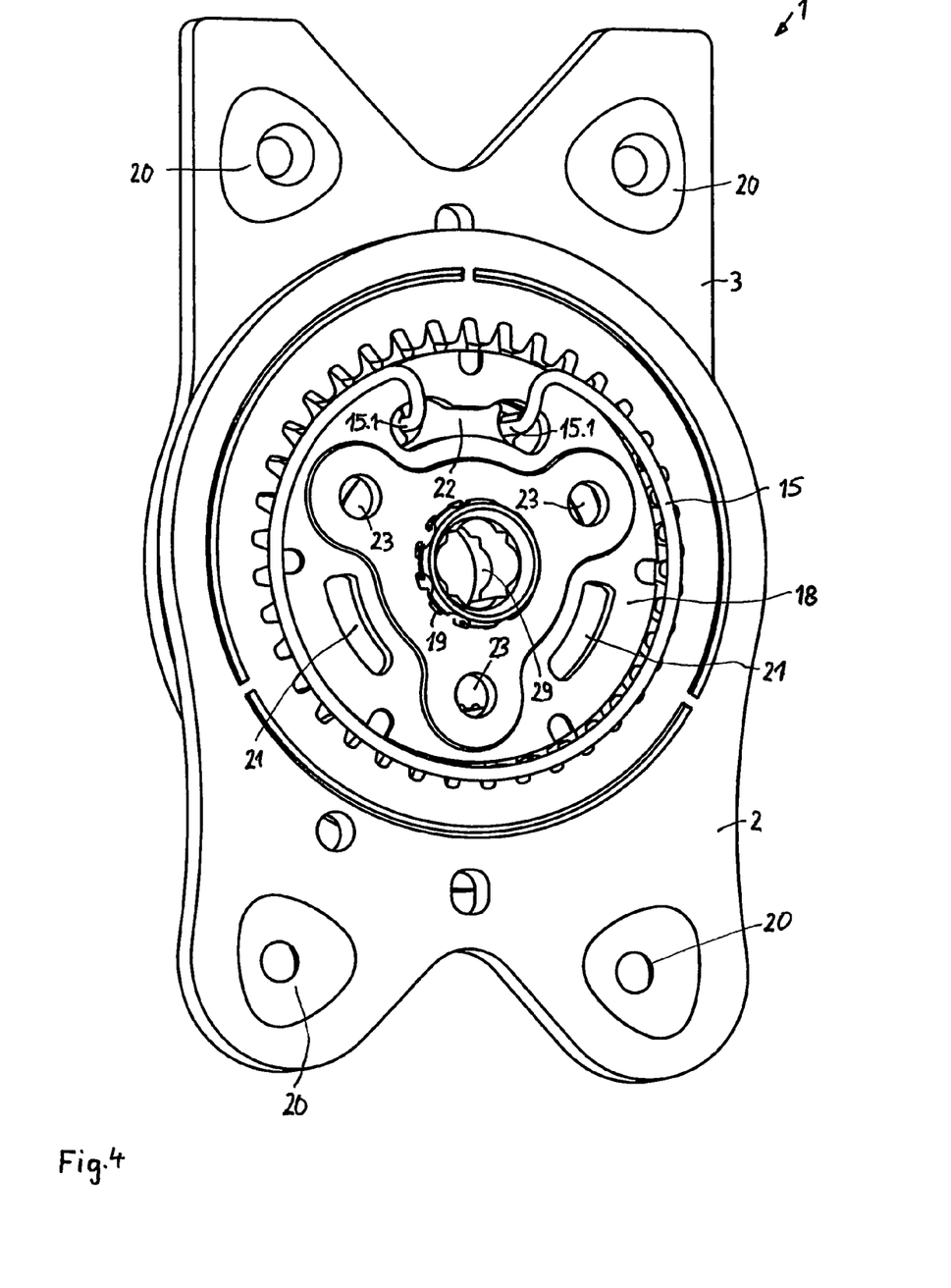
FIG. 4 shows a perspective view of the representation shown in FIG. 3, in the direction opposite the arrow A, with the end cap removed.
Figure 6:
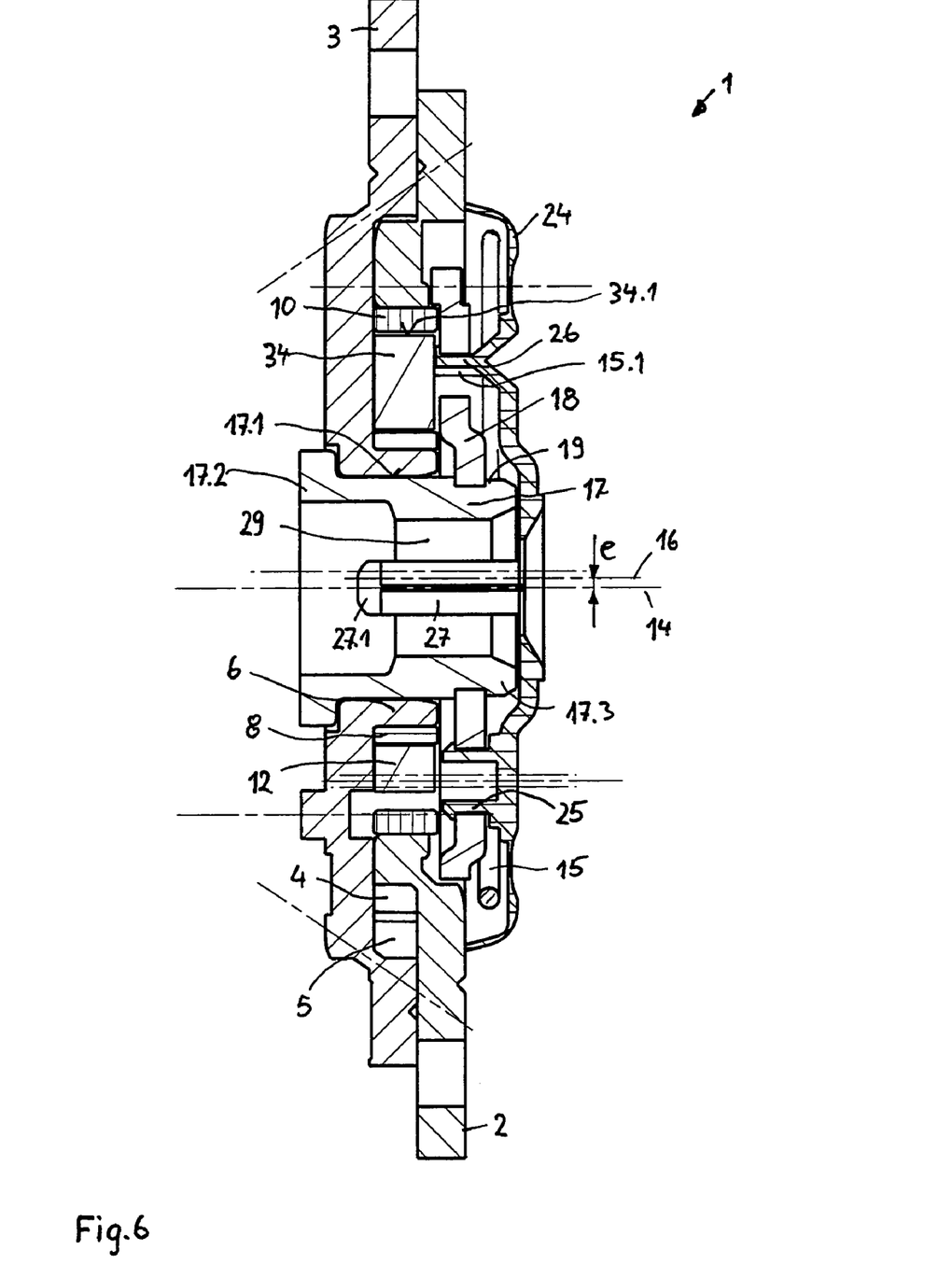
FIG. 6 shows a cross-section B-B of FIG. 5.

By virtue of this insertion of the eccentric element 11 between the two fitting parts 2 and 3, an eccentricity e is created between the central axis of the through opening 7 of the fitting part 3, which forms the pivoting axis 14 of the inclination adjustment fitting, and the central axis 16 of the through opening 9 in the fitting part 2 (see FIG. 3 and 6). This eccentricity e ensures that the external gearing 4 is forced into the internal gearing 5 of the fitting part 3 in an extension of the direction of the eccentricity e. In order to form this engagement of the external gearing 4 and the internal gearing 5, along with the bearing of the two fitting parts 2 and 3, without any play, the wedge segments 13 are acted upon by spring-loaded elements, such that they are forced away from one another peripherally on the eccentric ring 12 in the sense of an increase in eccentricity e. In the present exemplary embodiment an omega spring 15 is provided as the spring-loaded element, whose legs 15.1, which are bent at right angles, bear against the first end surfaces 13.3 of the wedge segments 13 that face one another, forcing the segments apart, as described.

The above-described arrangement ensures that the inclination adjustment fitting 1 is held in place, free from play, in each adjusted position of inclination of the back rest, because the forces exerted by the back rest are radially absorbed by the wedge segments 13; in that manner, no adjustment forces are exerted on them. The tension exerted by the omega spring 15 on the wedge segments 13 can be relieved only by tangential forces acting on the wedge segments 13. In order to introduce this type of adjusting motion on the eccentric elements 11, a two-piece carrier comprised of a carrier hub 17 and a carrier disk 18 is provided. The carrier is described in greater detail below.

Both the carrier hub 17 and the carrier disk 18 are made of metal. In this, the carrier hub 17 is configured as a die-cast piece, or forged component, and the carrier disk 18 is provided as a metal sheet punched component. The carrier hub 17 comprises a cylindrical center section 17.1, a collar 17.2, the diameter of which projects beyond the cylindrical center section 17.1, and a thrust collar 17.3, which is somewhat narrower in diameter and has an out-of-round cross-section, in other words its cross-section is configured to transmit torque. When the fitting is assembled, the center section 17.1 extends through the through opening 7 in the rim hole 6 with a small amount of radial play, with its collar 17.2 bearing against the fitting part 3 from the outside. On the other side of the inclination adjustment fitting 1, the carrier disk 18 is pushed onto the thrust collar 17.3 of the carrier hub 17. For this purpose, the carrier disk 18 is provided with a central opening 18.1 that has the same out-of-round cross-section as the thrust collar 17.3. Once the carrier disk 18 has been pushed onto the thrust collar 17.3, the carrier disk 18 rests non-rotatably on the carrier hub 17. In order to axially affix the carrier disk 18 to the carrier hub 17, the material of the thrust collar 17.3 is displaced onto the carrier disk 18, creating lugs 19 that project outward relative to the cross-section of the central opening 18.1 of the carrier disk 18, as is shown in FIG. 6. The carrier hub 17 and the carrier disk 18 are thus riveted to one another by means of the lugs 19.

As is also illustrated in FIG. 6, the collar 17.2 of the carrier hub 17, which bears against the fitting part 3, and the carrier disk 18, which bears against the fitting part 2 on the opposite side of the adjustment fitting 1, create an axial clamping of the two fitting parts 2 and 3, supplementary to the retainers, which are not shown in the drawings. These holding plates or retainers are welded to the fitting parts 2 and 3 via weld projections 20, and each overlaps the respective opposite fitting part 2 or 3 in areas along the periphery of the internal gearing 5 or the external gearing 4.

The carrier disk 18 is provided with two expressed carrier fingers 21. When the inclination adjustment fitting 1 is assembled, each of these carrier fingers 21 engages in a gap that forms between the eccentric ring 12 and the outer bearing ring 10. In this manner, when the eccentric elements 11 are not actuated, the end surfaces 21.1 of the carrier fingers lie a peripheral distance from the second end surfaces 13.4 of the wedge segments 13 that face away from the omega spring 15. This peripheral distance between the end surfaces 21.1 and second 13.4 is provided in order to prevent the restriction of the adjustment movement of the wedge segments 13 by the omega spring 15 that would be caused by the premature contact of these two surfaces 13.4 and 21.1. In this situation the other end surfaces 21.2 of the carrier fingers 21 are also spaced from the stop surfaces 32.1 of the stop cam 32.

In addition to the carrier fingers 21, the carrier disk 18 is also provided with openings 22 and 23. The legs 15.1 of the omega spring 15 extend through the opening 22, while the openings 23 are used in the attachment of a plastic end cap 24 on the carrier disk 18. To accomplish this, catch nubs 25 are provided on the end cap 24, which can be inserted into the openings 23 and latched at the backs of the openings. As a supplementary latching element, a spring tab 26 is provided on the end cap 24, which engages in the opening 22 in the carrier disk 18 and latches behind it.

The end cap 24 serves to cover the omega spring 15 and the carrier disk 18, and especially to cover the open articulation area of the inclination adjustment fitting 1, in order to protect this area from contamination, especially during painting operations.

Figure 5:
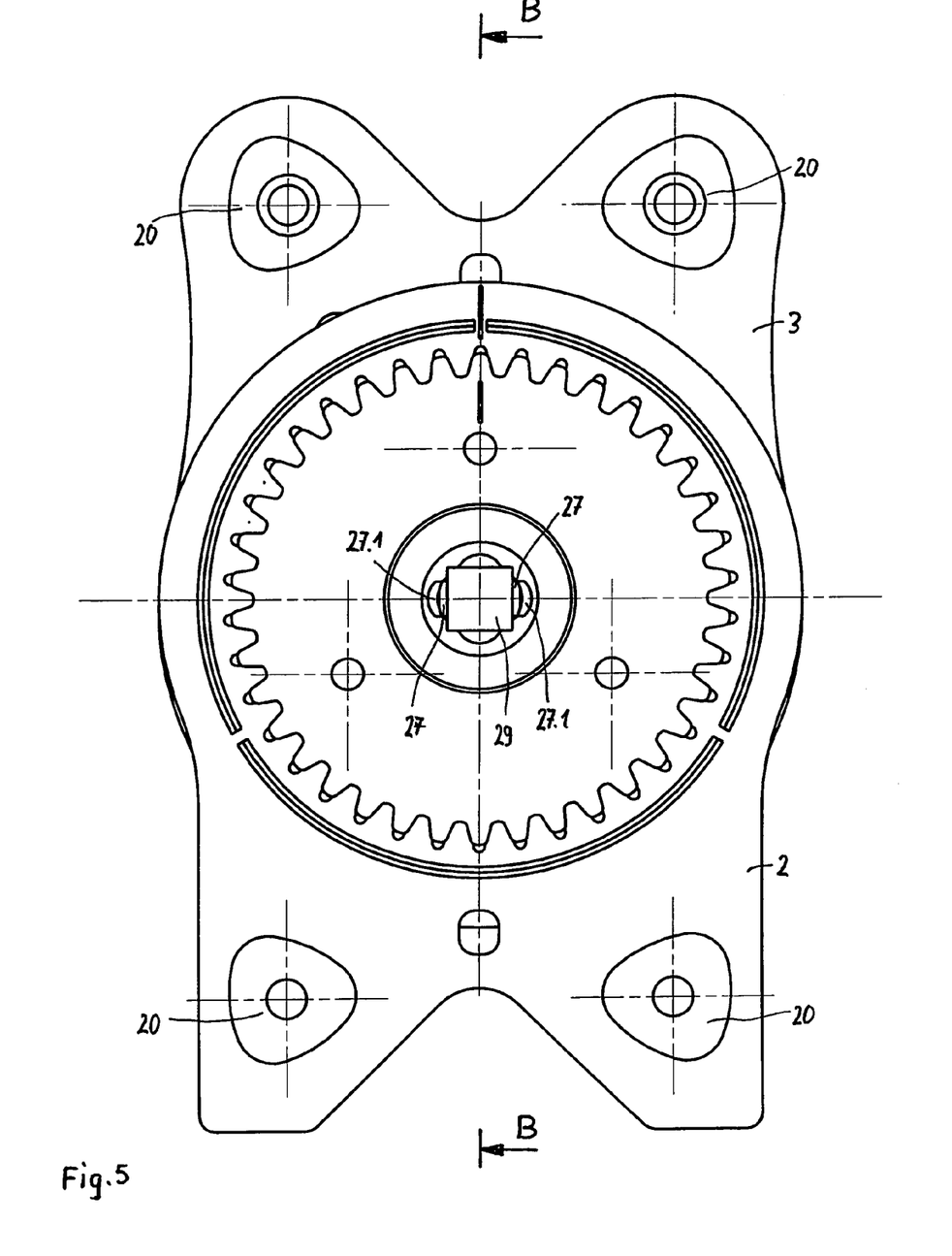
FIG. 5 shows a view of the embodiment of FIG. 3 in the direction of the arrow A.

The end cap 24 is provided with a hub formed by two tabs 27, which can be positively inserted into a central recess 28 in the carrier hub 17. In this arrangement, the inner surfaces of the tabs 27 rest against an out-of-round cross-section 29 for the positive accommodation of a drive shaft that is not illustrated here (see FIG. 5). This drive shaft is used to introduce a quantity of torque to the inclination adjustment fitting 1 and can be a part of a hand-operated wheel or a motor-driven shaft. At the ends of the tabs 27 on the end cap 24, latching tabs 27.1 that project radially outward are provided. Once the tabs 27 have been inserted into the carrier hub 17, these latching tabs latch behind a shoulder in the recess 28, as is shown in FIG. 6. When the drive shaft is installed, the tabs 27 can no longer be compressed radially inward, which serves to ensure the engagement between the tabs 27.1 and the shoulder.

The configuration of the end cap 24 that is described here, in conjunction with the carrier hub 17, ensures a secure axial fastening to the inclination adjustment fitting 1 and a supplementary axial clamping of the two fitting parts 2 and 3. Furthermore, the plastic tabs 27 arranged between the drive shaft and the carrier hub 17 prevent a metal-metal contact between the drive shaft and the carrier hub 17, whereby undesirable rattling sounds are prevented.

For details on the functioning of the inclination adjustment fitting 1, attention is directed to the relevant description in the above-cited patent application DE 10 2004 013 272 B3, which is incorporated herein by reference.

The inclination adjustment fitting 1 described in the present exemplary embodiment differs from that of the patent application DE 10 2004 013 272 B3 in that in this case a contact cam 34, which is configured to form a single piece with the eccentric ring 12 and is provided with a contact surface 34.1, projects into the gap 33 which is formed between the end surfaces 13.3 of the wedge segments 13. This contact surface 34.1 is positioned a slight radial distance from the inner surface 10.1 of the bearing ring 10. This distance is configured such that under normal operating conditions the wedge segments 13 both ensure the absence of play in the inclination adjustment fitting 1, and provide the eccentricity e that is required for the shifting of the inclination adjustment fitting 1 once the inclination adjustment fitting has been released. In the case of an excessive load, the distance between the contact surface 34.1 and the inner surface 10.1 of the bearing ring 10 is overcome by means of the deformation of the bearing rings 8 and 10 and of the rim hole 6, in other words the contact surface 34.1 of the contact cam 34 comes into contact with the inner surface 10.1 of the bearing ring 10. In this manner, the load is transferred from the back rest via the contact cam 34, bypassing the wedge segments 13, into the fitting part 2 and from there via the seat section into the body of a vehicle.

In a further unillustrated embodiment of the present invention, the contact surface 34.1 of the contact cam 34 is continuously in contact, in other words even during normal operation, with the inner surface 10.1 of the bearing ring 10. In this manner a fixed eccentric is created, that is, the function of the wedge segments 13 in producing a degree of eccentricity which is necessary for the shifting of the inclination adjustment fitting 1 is eliminated. They serve only to compensate for a degree of play that may be present due to geometric and positional tolerances. In this case, the contact surface 34.1 is to be configured as large as possible, in order to reduce the specific surface load. It goes without saying that with this embodiment as well, an excessive load is reliably diverted via the contact cam 34 into the fitting part 2.

The invention claimed is:

1. Inclination adjustment fitting for the back rest of a vehicle seat, comprising:
   a) a first fitting part affixable to a seat section of a vehicle seat;
   b) a second fitting part affixable to a back rest of a vehicle seat;
   c) the first fitting part being pivotable relative to the second fitting part around a pivoting axis;

d) a wobble gearing including gearings, and being provided with the fitting parts, the gearings rolling on one another under influence of an eccentric element;
e) the eccentric element being rotatable around the pivoting axis, and being provided with an eccentric ring, on which two wedge segments which cover regions of the eccentric ring lie, and the two wedge segments being arranged in a mirror image;
f) the wedge segments being forced away from one another in a sense of an increase in eccentricity by spring elements resting against their first end surfaces at one end, and the first end surfaces having a gap between them created by their lateral spacing from one another;
g) carrier elements being arranged between the second end surfaces of the wedge segments for the purpose of impinging upon the wedge segments and against the force of the spring device, the eccentric elements bearing the first fitting part affixable to a seat section of a vehicle seat;
h) the second fitting part affixable to the back rest bearing the eccentric elements, and a contact cam, which is configured to form a unitary piece with the eccentric ring, projecting into a gap formed between the first end surfaces of the wedge segments; and
i) the contact cam including a contact surface, the contact surface being configured to transfer a load via the contact surface from the second fitting part affixed to the back rest, in use, to the first fitting part affixed to the seat section of a vehicle seat, in use.

2. Inclination adjustment fitting according to claim 1, wherein:
   a) the contact surface of the contact cam is arranged a slight radial distance from the second fitting part affixed to the back rest, in use.

3. Inclination adjustment fitting according to claim 1, wherein:
   a) the contact surface of the contact cam is configured to be in continuous contact with the second fitting part affixed to the back rest, in use.

4. Inclination adjustment fitting according to claim 3, wherein:
   a) the contact surface of the contact cam is configured to be as large as possible, in order to reduce the specific surface load, in use.

\* \* \* \* \*